US010931921B2

(12) United States Patent
Goldfeder et al.

(10) Patent No.: US 10,931,921 B2
(45) Date of Patent: *Feb. 23, 2021

(54) TECHNIQUES TO PROVIDE A MICRO-BROADCAST OF AN EVENT

(71) Applicant: CBS Interactive Inc., San Francisco, CA (US)

(72) Inventors: Bruce Goldfeder, Culver City, CA (US); Stephen Martin Milton, Red Hook, NY (US)

(73) Assignee: CBS Interactive Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/201,637

(22) Filed: Nov. 27, 2018

(65) Prior Publication Data

US 2019/0098259 A1 Mar. 28, 2019

Related U.S. Application Data

(63) Continuation of application No. 13/690,563, filed on Nov. 30, 2012, now Pat. No. 10,178,352.

(51) Int. Cl.

| *H04N 7/18* | (2006.01) |
|---|---|
| *H04N 21/218* | (2011.01) |
| *H04N 21/236* | (2011.01) |
| *H04N 21/854* | (2011.01) |
| *H04H 20/04* | (2008.01) |
| *H04H 60/07* | (2008.01) |
| *G06F 3/048* | (2013.01) |
| *H04N 21/2365* | (2011.01) |
| *H04N 21/8549* | (2011.01) |
| *G06F 3/0484* | (2013.01) |

(52) U.S. Cl.
CPC .......... *H04N 7/181* (2013.01); *H04H 20/04* (2013.01); *H04H 60/07* (2013.01); *H04N 21/21805* (2013.01); *H04N 21/2365* (2013.01); *H04N 21/8549* (2013.01); *A63B 2220/807* (2013.01); *G06F 3/0484* (2013.01)

(58) Field of Classification Search
CPC ........ G11B 27/00; H04H 20/04; H04H 60/07; H04N 21/21805; H04N 21/2365; H04N 21/8549; H04N 7/181
USPC ............. 348/157, 169; 342/357.31; 455/3.02
See application file for complete search history.

(56) References Cited

U.S. PATENT DOCUMENTS

| 5,568,205 | A | 10/1996 | Hurwitz | |
|---|---|---|---|---|
| 7,240,075 | B1* | 7/2007 | Nemirofsky | ......... G06K 9/2081 |
| 8,787,821 | B2* | 7/2014 | Lim | ................... H04N 21/6112 348/729 |
| 2010/0026809 | A1* | 2/2010 | Curry | .................... H04N 5/222 348/157 |

(Continued)

*Primary Examiner* — Thai Q Tran
*Assistant Examiner* — Syed Y Hasan

(57) ABSTRACT

Techniques to provide a micro-broadcast of an event are described. Video data streams of a live event at a venue may be captured in one or more wireless camera devices. The data streams may be sent to one of a network of wireless access points where they are relayed to a control center. A computer system in the control center may select one of the video data streams to be broadcast as a micro-broadcast. The selected video data stream may then be formatted for the micro-broadcast before a micro-broadcast transmitter broadcasts the formatted selected video data stream.

20 Claims, 10 Drawing Sheets

(56) References Cited

U.S. PATENT DOCUMENTS

2010/0060740 A1  3/2010  Anderson, Jr. et al.

* cited by examiner

100

200

1100

1200

1300

1400

TECHNIQUES TO PROVIDE A MICRO-BROADCAST OF AN EVENT

CROSS-REFERENCE TO RELATED APPLICATION

This application is a continuation of, claims the benefit of and priority to previously filed U.S. patent application Ser. No. 13/690,563 filed Nov. 30, 2012, entitled "TECHNIQUES TO PROVIDE A MICRO-BROADCAST OF AN EVENT", which is hereby incorporated by reference in its entirety.

BACKGROUND

Many sporting events are televised live. In some sports, such as golf, a patron cannot view all of the action because the "playing field" is too large and/or dispersed over acres of ground. A golf tournament encompasses eighteen (18) holes of golf. A patron can only view a small portion of the live activities at any given time depending on their location on the golf course. Similarly, a tennis tournament may be spread among multiple tennis courts in different stadiums. A patron may only be in one of those stadiums and cannot view action in another stadium. Thus, attending a sporting event may have some drawbacks when it comes to viewing the event.

The overall level of satisfaction when attending a sporting event may be increased if the patron were able to receive and view television coverage of the event while also being physically present at the event. It is impractical, however, to carry a television receiver at an event especially if the over-the-air (OTA) broadcast signal is difficult to tune based on the geographic location of the event.

It is with respect to these and other considerations that the present improvements have been needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to provide a micro-broadcast. Some embodiments are particularly directed to techniques to provide a micro-broadcast for a live sporting event such as a golf tournament. In one embodiment, for example, a system may comprise one or more wireless camera devices to capture video data streams of a live event at a venue, a network of wireless access points arranged about the venue so as to provide wireless communication coverage of the entire venue, each wireless access point operative to establish a wireless connection with the one or more wireless camera devices that are within range of a wireless access point to receive the video data streams from the one or more wireless camera devices, and a control center. The control center may comprise a processor component that controls a switching component and a formatting component. The switching component may be operative on the processing component to select one of the video data streams to be micro-broadcast. The formatting component may be operative on the processing component to format the selected video data stream for the micro-broadcast.

In another embodiment, for example, the formatting component may be further operative to format the selected video data stream for a regular television broadcast and a video streaming broadcast.

In another embodiment, for example, the system may comprise a multiplexer operative to multiplex the video data streams from each of the wireless access points into a single video data signal and a de-multiplexer to de-multiplex the multiplexed video data signal back into the video data streams before selecting one of the video data streams to be broadcast. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
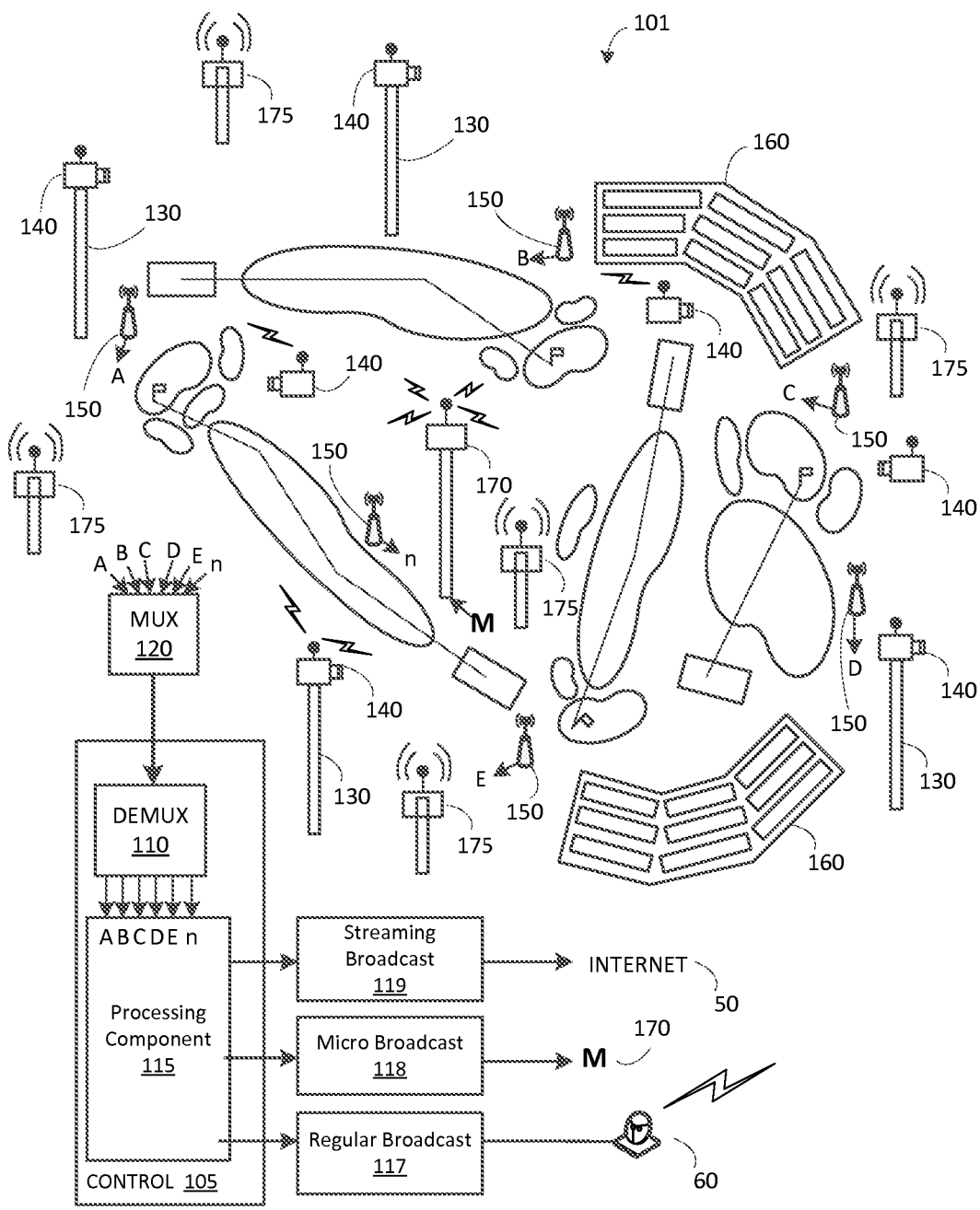
FIG. 1 illustrates an embodiment of a system to enable a micro-broadcast of an event.

As described above, a patron of an event such as a sporting event may only be able to view a portion of the event at any given moment. The patron of a golf tournament, for example, may be located at the $11^{th}$ green viewing a group of players while action of interest is occurring at the $16^{th}$ green. The patron will not be able to see what is happening at the $16^{th}$ green, however. A similar scenario may occur at a tennis tournament. The patron may be seated at court six viewing one match while another match is ongoing at court 1. The patron will not be able to see the action occurring on court 1. A similar type scenario may even occur for an event at a single location such as, for instance, a football game. Often times, the patron may be outside the field of view in a concession line. Or, the patron may simply wish to enjoy the broadcast commentators while at the live event.

In circumstances like those described above, a micro-broadcast system is disclosed herein that can deliver a video broadcast to a confined area that services patrons attending the event.

In one embodiment, multiple wireless access points are dispersed throughout the grounds. The wireless access points are communicable with multiple roving and stationary wireless cameras. The wireless cameras may capture and forward video data streams to the nearest wireless access point. Each of the wireless access points may be coupled with a multiplexer. The multiplexer may be operative to combine the video data streams from each of the wireless access points into a single data signal. The single data signal may then be transmitted wirelessly or via a cabled connection to a control center. The control center may be operative to receive, manipulate, and distribute video data. The control center may include a de-multiplexer to separate the video data signal into its constituent wireless access point component video data streams. The video data streams may be stored and/or buffered in a memory device. As in a typical live event broadcast, a technician, usually under the guidance of a director, may cause a processing component to execute an application that selects one of the de-multiplexed video data streams to be broadcast. The selected video data stream may then be formatted for regular broadcast to a television audience. The formatted broadcast video data stream may then be forwarded to a satellite up-link for broadcast.

In addition to formatting the selected video data stream for regular broadcast to a television audience, the selected video data stream may be separately formatted for video streaming over a TCP/IP network such as the Internet. The video streaming formatted video data stream may then be forwarded to a server controlled by the broadcaster (e.g., CBS) where it is configured for distribution to computer devices of end users over the Internet and/or mobile IP devices over a combination of the Internet and mobile IP networks.

Moreover, the selected video data stream may be separately formatted for an over-the-air (OTA) micro-broadcast. The formatting may include modulating the formatted video data stream for transmission over a specific, localized frequency range. A transmitter for this micro-broadcast signal may be operative to broadcast the selected video data stream to cover an area largely confined to the area of the event. One technique for controlling the distance the micro-broadcast video data stream may be received is to limit the power of the transmitter.

In each of the broadcast scenarios above (regular, streaming, and micro), additional data and/or graphics may be added to or inserted in the formatted video data stream. Thus, the resultant broadcast video data stream may include text and/or graphics in addition to the video data stream initially captured by the camera.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates an embodiment of a system 100 to enable a micro-broadcast of an event. An event may include, but is not limited to, a sporting event, an entertainment event, a news event, or the like. For purposes of illustration, creating and distributing a micro-broadcast of a sporting event is used to describe the embodiments herein. Specifically, the sporting event described is a golf tournament.

FIG. 1 generally illustrates a block diagram for a system 100 operative to capture and broadcast a golf tournament. A golf tournament is generally staged at a golf course that encompasses eighteen (18) holes that are spread over many acres of land. Patrons are generally free to roam about the golf course to view action at any of the holes. FIG. 1 illustrates a portion 101 of the golf course as would be viewed from above. For example, four (4) holes of the eighteen (18) are illustrated as well as grandstands 160 for seating patrons. In one embodiment, the system 100 may comprise a network of wireless cameras 140, wireless access points 150, WiFi hot spots 175, a micro-broadcast transmitter 170, and a control center 105. The control center 105 may be implemented as a mobile truck equipped with video and computer devices capable of providing a broadcast of the golf tournament. The broadcast may include a regular broadcast 117, a micro-broadcast 118, and a streaming broadcast 119. Although the system 100 shown in FIG. 1 has a limited number of elements in a certain topology, it may be appreciated that the system 100 may include more or less elements in alternate topologies as desired for a given implementation.

WiFi is a technology that allows an electronic device to exchange data wirelessly (using radio waves) over a computer network, including high-speed Internet connections. Wi-Fi may be characterized as any wireless local area network (WLAN) products that are based on the Institute of Electrical and Electronics Engineers (IEEE) 802.11 standards. A device that can use Wi-Fi (such as a personal computer, video game console, smartphone, tablet, or digital audio player) can connect to a network resource such as the Internet via a wireless access point. Such an access point (or hotspot) typically has a range of about 20 meters (65 feet) indoors and a greater range outdoors. Hot spot coverage may comprise an area as small as a single room with walls that block radio waves or as large as many square miles using multiple overlapping access points.

As shown in FIG. 1, multiple wireless cameras 140 may capture video data streams of the golf tournament. Because it is a wireless camera 140 is, it may be moved about the venue of the golf tournament to obtain different views of the event. Moreover, there may be many wireless cameras 140 in operation at any given time. Some may even be fixed in location atop poles or towers to provide elevated views. Each of the wireless cameras relays the video data stream it captures to one of a plurality of wireless access points 150 depending on the geographic relation among the wireless cameras 140 and the wireless access points 150. Typically, a wireless camera 140 will relay its video data stream to the nearest wireless access point with which it can and has established a connection using well known techniques. Each of the wireless access points 150, in turn, may be coupled with a multiplexer 120. The multiplexer 120 is operative to aggregate the video data streams from all of the wireless access points 150 into a single video data signal. In addition, the multiplexer 120 may be strategically situated to avoid disturbance by patrons and provide the shortest distance in cabling to each of the wireless access points 150. The multiplexer 120 may be coupled with the control center 105. It may be a direct cabled connection or a point-to-point wireless connection. If a cabled connection, only a single cable may be necessary as the video data streams have been multiplexed together. More specifically, the multiplexer 120 may be coupled with a de-multiplexer 110 within or communicable with control center 105. The de-multiplexer 110 may be operative to separate the multiplexed video data streams into their constituent video data streams associated with the wireless access point 150 from which they came. At this point, the control center 105 has control over each of the video data streams associated with a wireless access point 150. Alternatively, the video data streams may be conveyed directly from a wireless access point 150 to the control center 105 without being multiplexed and de-multiplexed.

The control center 105 may then process the received video data streams and broadcast a selected video data stream using a traditional regular (e.g., television) broadcast system 117, a video streaming (e.g., TCP/IP) broadcast system 119, or a newly devised micro-broadcast system 118.

Figure 2:
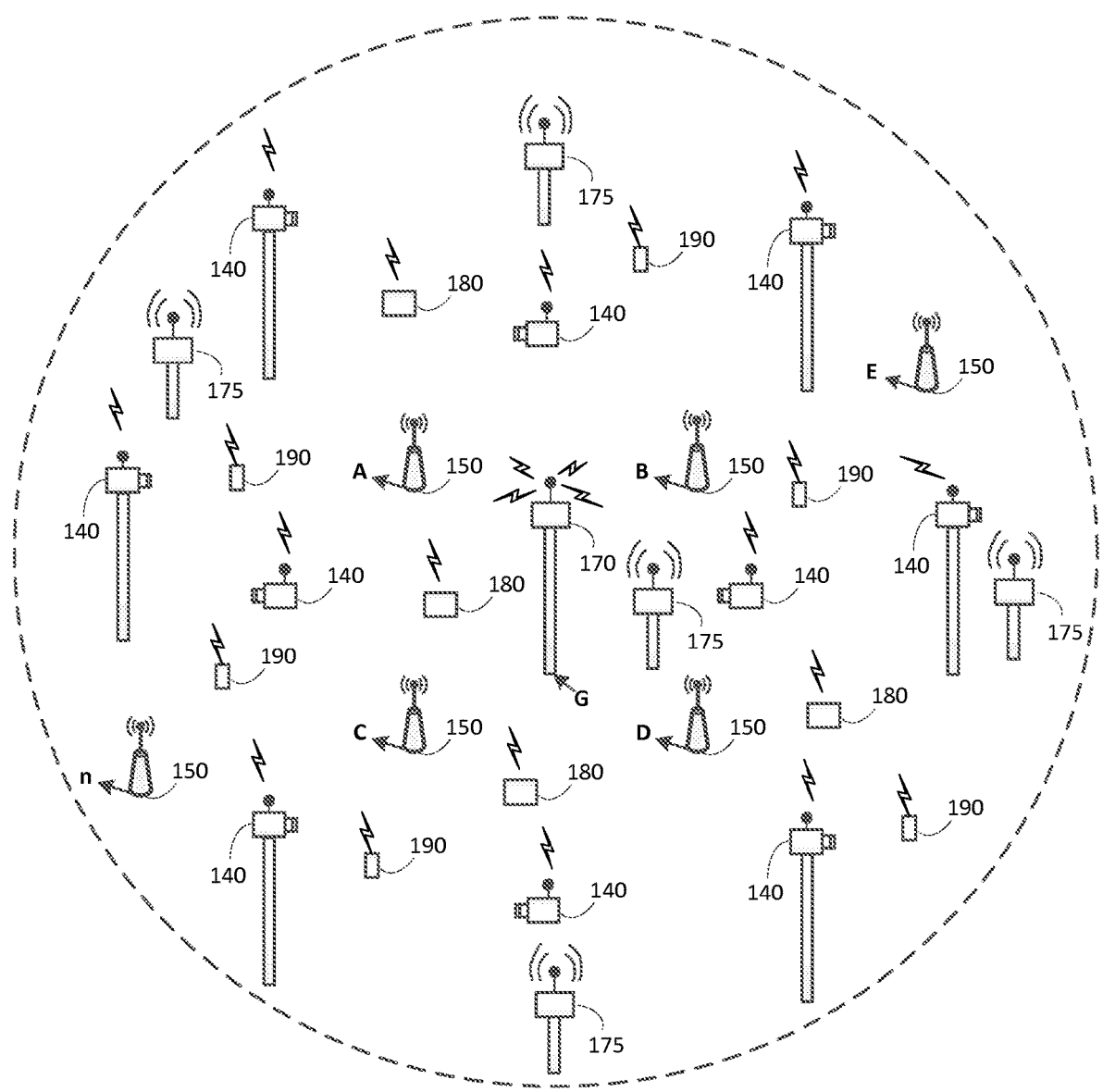
FIG. 2 illustrates an embodiment of a communications network to enable a micro-broadcast of an event.

FIG. 2 illustrates an embodiment of a communications network 200 to enable a micro-broadcast of an event. The elements shown include wireless cameras 140, wireless access points 150, a micro-broadcast transmitter 170, WiFi hotspots 175, wireless tablet devices 180, and micro-broadcast receiver devices 190. The wireless cameras 140 and wireless access points 150 may be operative to capture a video data stream and forward it to a control center for processing. The micro-broadcast transmitter 170 and WiFi hotspots 175 may be operative to receive a formatted video data stream from the control center and transmit or broadcast the video data stream to a localized audience of users. The wireless tablet devices 180 and micro-broadcast receiver devices 190 may receive a broadcast video data stream from either the micro-broadcast transmitter 170 or a WiFi hotspot 175 depending on the receiver hardware being used by the wireless tablet devices 180 and micro-broadcast receiver devices 190.

In addition, the wireless tablet devices 180 may also be used as a source of video data that may be combined with the wireless camera 140. For example, the wireless tablet devices 180 may be issued to on-course reporters. On-course reporters typically roam the venue to follow particular groups of players or may be stationed at a particular hole as groups of players come through. Even if stationed at a single hole, an on-course reporter may roam the entire length of the hole along with a camera operator utilizing a wireless camera 140. The wireless tablet devices 180 may be equipped with a telestrator application that allows the on-course reporter to draw or sketch on the image on the display screen using a stylus like instrument or a finger. The image on the wireless tablet device 180 display screen may be a real-time image of the broadcast feed. The wireless tablet devices 180 may be able to communicate directly with the wireless access points 150 to transmit telestrator drawings back to the control center. The telestrator drawings may then be incorporated into the broadcast feed in very near real-time. This gives on-course reporters the same ability to enhance a broadcast using a telestrator as the analysts and commentators that are hardwired with the control center.

Figure 3:
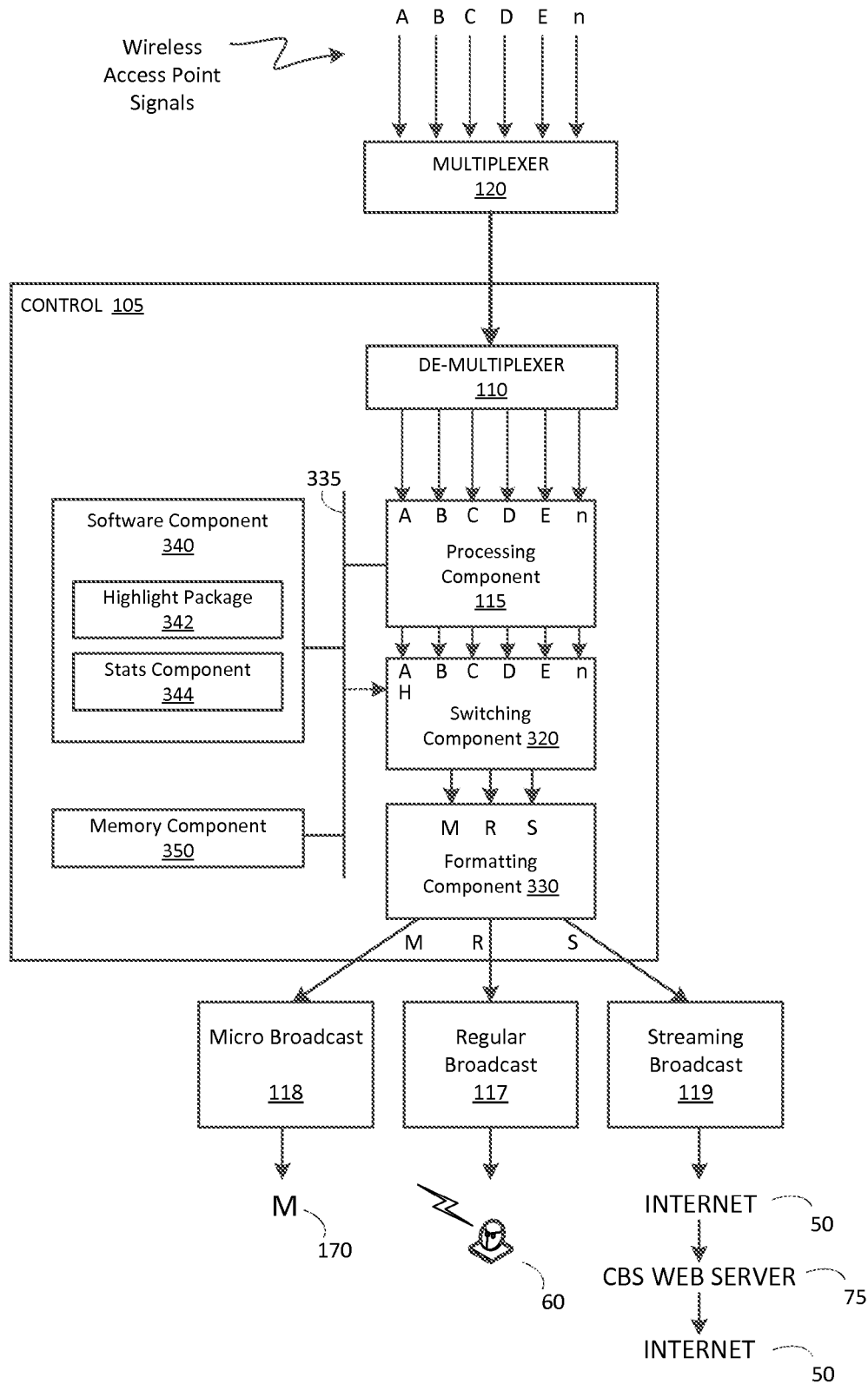
FIG. 3 illustrates an embodiment of a system for receiving and broadcasting a video data stream.

FIG. 3 illustrates an embodiment of a system for receiving and broadcasting video data streams. Each of the wireless access points 150 forwards a video data stream to a multiplexer 120. In this example, there are six (6) video data streams (A, B, C, D, E, n) that are multiplexed into a single video data signal by multiplexer 120. The multiplexed video data signal may then be forwarded to the control center 105 using a direct cable connection. Alternatively, the multiplexed video data signal may then be forwarded to the control center 105 using a wireless link.

A de-multiplexer 110 may receive the multiplexed video data signal and de-multiplex it into its original constituent component video data streams (e.g., A, B, C, D, E, n). The de-multiplexed video data streams (A, B, C, D, E, n) may be operated on by a processing component 115. The processing component 115 may be coupled with a bus line 335. The bus line 335 may allow the processing component 115 to operate on and/or communicate with a software component 340 and a memory component 350. Thus, the processing component 115 may cause the de-multiplexed video data streams (A, B, C, D, E, n) to be temporarily buffered and/or permanently stored in the memory component 350. The software component 340 may further include a highlight package application 342 and a stats component application 344.

The highlight package application 342 may comprise an interface to allow an operator to access video data streams stored in memory component 350. The operator may then edit various video data streams into a highlight video clip and store it back into the memory component 350 where it may be accessed later and broadcast. For example, an operator may pull video data streams pertaining to a specific golfer as captured on multiple holes from multiple different cameras (wired or wireless) that are stored in the memory component 350. The operator may then organize multiple portions of the various video data streams into a single coherent video clip that presents video data of the specific golfer over the last several holes. This is often referred to as a highlight package and may be characterized as its own video data stream (H) in FIG. 3. The highlight package may then be broadcast to a viewing audience at a point determined by another operator (e.g., a director) in the control center 105. For example, the director may decide to insert the highlight package (H) to show the viewing audience how a specific golfer has been ascending the leaderboard recently.

The stats component application 344 may allow an operator to create and insert text and/or graphics into a video data stream. For example, the operator may create a leaderboard table to be inserted into a video data stream to be broadcast. The leaderboard table may include graphics such as a particular table design, the broadcasting network logo and the golf tournament corporate sponsor logo, etc. In another example, the operator may insert a text/graphic indicating the current score of a player that is being shown in the video data stream. In yet another example, the operator may insert statistics pertaining to a hole such as its par, its length, the field scoring average, and a difficulty ranking relative to the other holes. The embodiments are not limited to these examples.

The processing component 115 may also be operative on a switching component 320. The switching component 320 may receive multiple video data streams including those (e.g, A, B, C, D, E, n) from the wireless access points 150, any highlight package video data signals (H) as well as any other video data streams from other sources. An operator (e.g., director) may then decide which of the multiple video data streams to send to a regular broadcast, a micro-broadcast, and a streaming broadcast. The switching component 320 may then cause selected video data streams to be sent to a formatting component 330. Thus, the director, via the switching component 320, may send the same video data stream for the different broadcasts or may send different video data streams for different broadcasts (e.g., regular (R), micro (M), streaming (S)). The formatting component 330 may receive the selected video data stream(s) from the switching component 320 and format the video data stream in a format appropriate to the type of broadcast.

For example, for a regular television broadcast 117, the formatting component 330 may format the video data stream according to any one or more well known broadcast television standards including, but not limited to, National Television System Committee (NTSC), Phase Altering Line (PAL), Systeme Electronique pour Couleur avec Mèmoire (SECAM), Digital Video Broadcast (DVB), and the Digital Television (DTV). DTV may include standard definition (SDTV), enhanced definition (EDTV), and high definition (HDTV) formats. The regular broadcast 117 formatted video data stream may then be sent to a satellite uplink 60 for general broadcast to a nationwide television viewing audience. The embodiments are not limited to these examples.

For a streaming broadcast 119, the formatting component 330 may format the video data stream for viewing on computer based streaming video players. The most common streaming protocol may be the H.264 standard which is a standard for video compression developed by the ITU-T Video Coding Experts Group (VCEG) together with the International Organization for Standardization (ISO)/International Electrotechnical Commission (IEC) joint working group, and the Moving Picture Experts Group (MPEG). H.264 is currently one of the most commonly used formats for the recording, compression, and distribution of high definition video. H.264 is widely used by streaming Internet sources as well as various HDTV broadcasts over terrestrial (ATSC, ISDB-T, DVB-T or DVB-T2), cable (DVB-C) and satellite (DVB-S and DVB-S2).

The streaming broadcast 119 may be securely forwarded from the control center 105 to a web server 75 via the Internet 50. The web server 50 would likely be associated with the broadcaster. The web server 50 may then distribute the streaming broadcast 119 to Internet enabled user devices over the Internet 50. Distribution from the web server 50 may be based on a subscription service, a registered account service, a one time fee service, or may be made available for free. Most any Internet enabled device that includes a decoder may be able to display the streaming broadcast. In one example, there may be several WiFi hotspots 175 dispersed throughout the venue to allow personal user devices such as, for instance, smartphones to connect to the Internet to access the streaming broadcast 119.

For a micro broadcast 118, the formatting component 330 may format the video data stream for broadcast to a very localized geographic area. For example, the video data stream may be formatted to be broadcast over frequencies such as, but not limited to, the 1.5 GHz range or 7 GHz range. The micro broadcast 118 formatted video data stream may then be sent to a micro-broadcast transmitter 170 to transmit the video data stream. A specialized micro-broadcast receiver device 190 adapted to receive and display the micro-broadcast video data stream may be handed out to patrons. Alternatively, the micro-broadcast receiver device 190 may be offered to patrons as a value add to the experience for a nominal fee.

Figure 4:
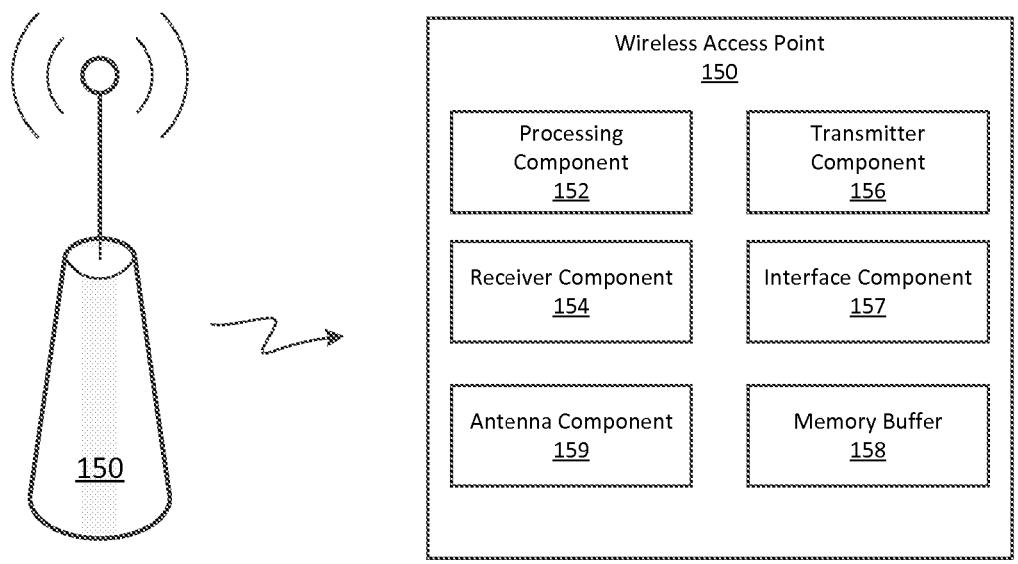
FIG. 4 illustrates an embodiment of a wireless access point.

FIG. 4 illustrates an embodiment of a wireless access point 150. Prior to wireless networks, setting up a computer network in a business, home or school often required running many cables through walls and ceilings in order to deliver network access to all of the network-enabled devices in the building. With the creation of the wireless access point 150, network users are now able to add devices that access the network with few or no cables. A wireless access point 150 normally connects directly to a wired Ethernet connection and the wireless access point 150 then provides wireless connections using radio frequency links for other devices to utilize that wired connection. Most wireless access points 150 support the connection of multiple wireless devices to one wired connection. Modern wireless access points 150 are built to support a standard for sending and receiving data using these radio frequencies. Those standards, and the frequencies they use may be defined by the Institute for Electrical and Electronics Engineers (IEEE). Most wireless access points 150 use IEEE 802.11 standards.

The wireless access point 150 may be comprised of a processing component 152, a receiver component 154, a transmitter component 156, an interface component 157, a memory buffer 158, and an antenna component 159. The processing component 152 may control the flow of data into and out of the wireless access point 150 by controlling the other components. The receiver component 154 may receive video data streams wirelessly from the wireless cameras 140. The transmitter component 156 may send video data streams wirelessly to other components. The interface component 157 may be, for example, an Ethernet interface adapted to send data from the wireless access point 150 to the multiplexer 120 (or control center 105) over a hardwired cable supporting the TCP/IP protocol. The memory buffer 158 may be operative to temporarily buffer incoming video data signals before they can be sent out. The memory buffer 158 may also provide more permanent storage that may be accessed at a later date to retrieve received video data streams. The antenna component 159 is essentially an electrical device that converts electric power into radio waves, and vice versa and may be adapted to enable the functional capabilities of the receiver component 154 and the transmitter component 156.

Figure 5:
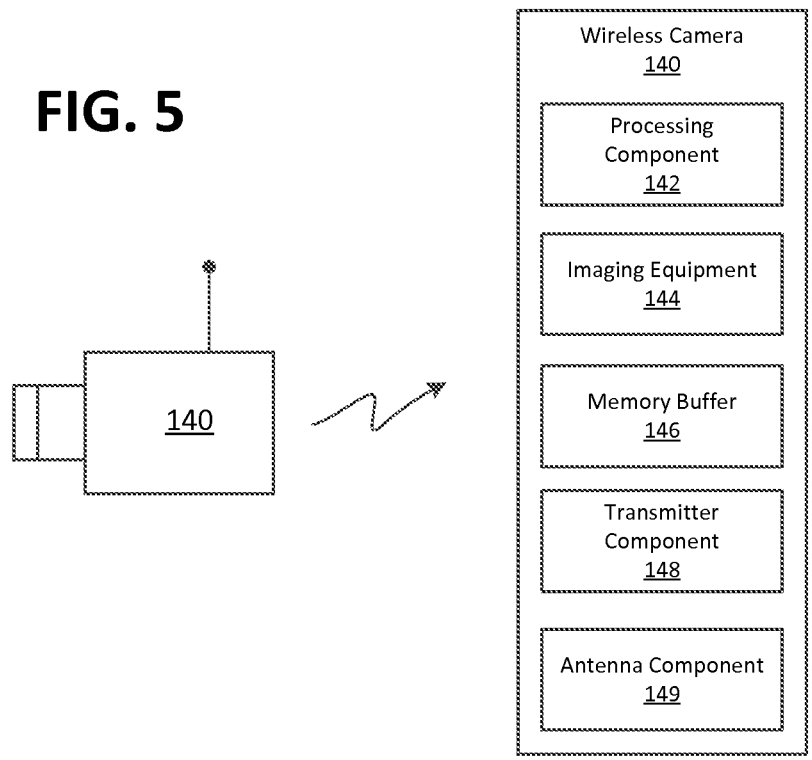
FIG. 5 illustrates an embodiment of a wireless camera.

FIG. 5 illustrates an embodiment of a wireless camera 140. The wireless camera 140 may be comprised of a processing component 142, imaging equipment 144, a memory buffer 146, a transmitter component 148, and an antenna component 149. The processing component 142 may control the flow of data into and out of the wireless camera 140 by controlling the other components. The imaging equipment 144 may capture sequences of images (i.e., a video data stream) in a particular or specified format. The imaging equipment 144 may also include equipment (e.g., hardware and software) to convert and encode the captured video data stream to a format suitable for transmission to a wireless access point 150. The memory buffer 146 may be operative to temporarily buffer the captured video data stream before it can be sent out. The memory buffer 146 may also provide more permanent storage that may be accessed at a later date to retrieve received video data stream. The transmitter component 148 may send the captured video data stream wirelessly to the nearest wireless access point 150 with which it has an established connection. The antenna component 159 is essentially an electrical device that converts electric power into radio waves, and vice versa and may be adapted to enable the functional capabilities of the transmitter component 148.

Figure 6:
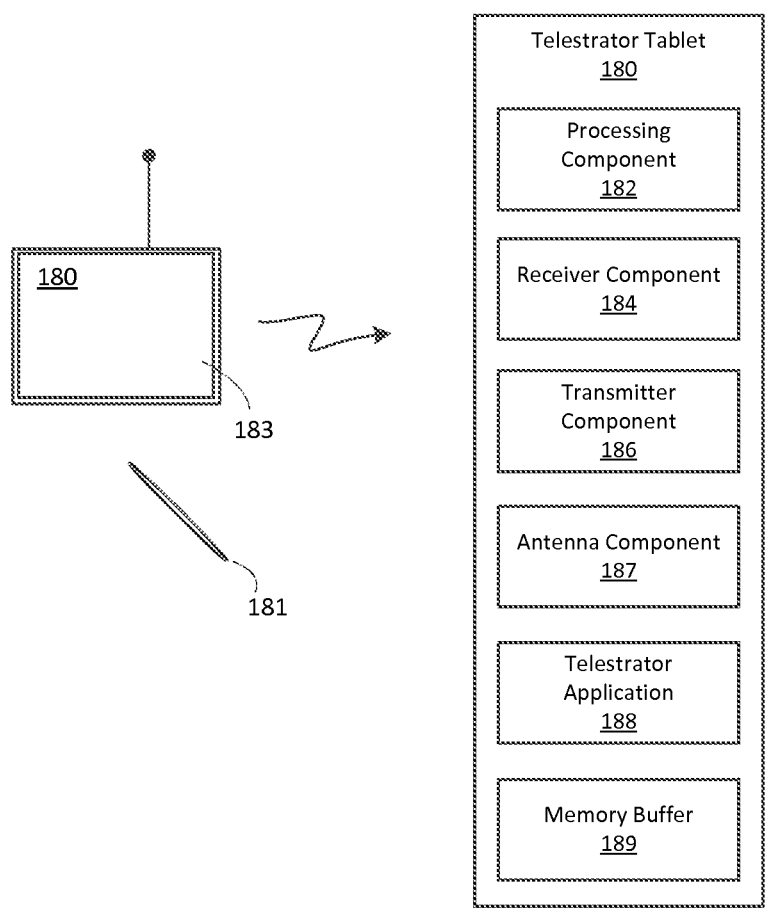
FIG. 6 illustrates an embodiment of a telestrator tablet.

FIG. 6 illustrates an embodiment of a telestrator tablet 180. The telestrator tablet 180 may be comprised of a processing component 182, a receiver component 184, a transmitter component 186, an antenna component 187, a telestrator application 188, and a memory buffer 189. The processing component 182 may control the flow of data into and out of the telestrator tablet 180 by controlling the other components. The receiver component 184 may receive video data streams wirelessly from one of the wireless cameras 140 or from a wireless hotspot 175. The transmitter component 186 may send data signals wirelessly to other components including a wireless access point 150 with which it has established a connection. The antenna component 187 is essentially an electrical device that converts electric power into radio waves, and vice versa and may be adapted to enable the functional capabilities of the receiver component 184 and the transmitter component 186. The telestrator application 188 may comprise software specifically operative to allow a user by way of a stylus instrument 181 to compose text and graphics on a display screen 183 of the telestrator tablet. The display screen 183 may be a touchscreen adapted to receive input based on contact between the display screen 183 and the stylus instrument 181. In many cases, a user may use a finger in lieu of a stylus instrument 181. The memory buffer 189 may be operative to store telestrator input and other data.

In operation, the telestrator tablet 180 may receive a video data stream from one of the wireless cameras 140 directly or may receive the micro-broadcast 118 from the micro-broadcast transmitter 170. The user of the telestrator tablet 180 may then use the stylus instrument 181 to draw on the touch screen display 183 under the control of the telestrator application 188 and processing component 182. The data representative of the drawing made by the telestrator user may be sent back to the control center 105 by way of a wireless access point 150. The control center 105 may then include the telestrator data into the regular broadcast 117, the micro-broadcast 118, and the streaming broadcast 119 to give viewers an enhanced viewing experience. The broadcast emanating from the control center may be delayed by a specified number of video frames to allow for the telestrator data to be inserted into the various broadcasts.

Figure 7:
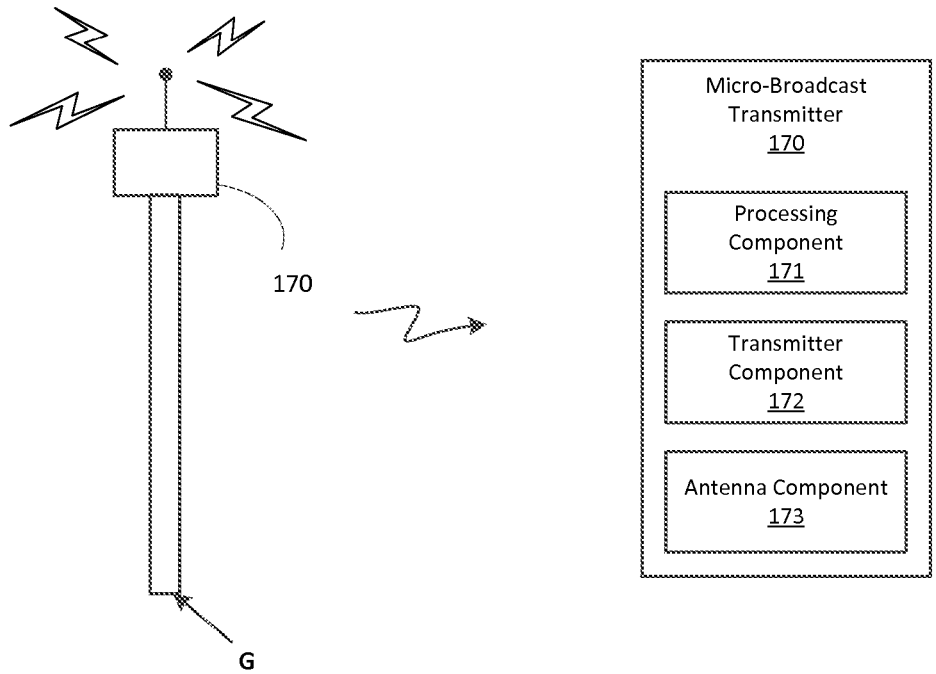
FIG. 7 illustrates one embodiment of a micro-broadcast transmitter.

FIG. 7 illustrates one embodiment of a micro-broadcast transmitter 170. The micro-broadcast transmitter 170 may be comprised of a processing component 171, a transmitter component 172, and an antenna component 173. The processing component 171 may control the flow of data into and out of the micro-broadcast transmitter 170 by controlling the other components. The transmitter component 171 may broadcast a formatted video data stream to a localized audience. The antenna component 173 is essentially an electrical device that converts electric power into radio waves, and vice versa and may be adapted to enable the functional capabilities of the transmitter component 171.

In operation, the micro-broadcast transmitter 170 may receive a formatted video data stream from the control center 105. The formatted video data stream may be specifically formatted for broadcast over a radio frequency spectrum reserved for the micro-broadcast 118. The micro-broadcast transmitter 170 may be power limited to ensure that the broadcast video data stream covers the venue intended but does not propagate much beyond before becoming too weak to be received. In addition to limiting the power, the antenna component 173 may be specifically designed to radiate the formatted video data stream to an intended area.

Figure 8:
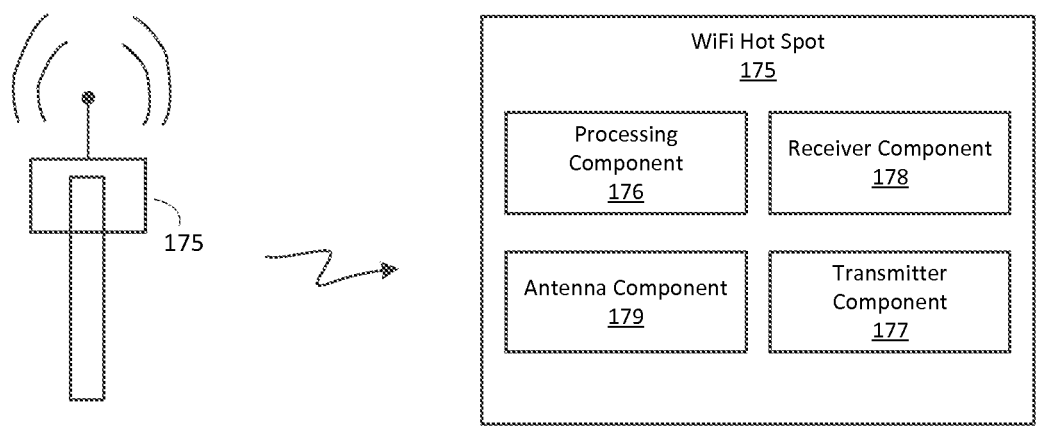
FIG. 8 illustrates one embodiment of a WiFi hot spot.

FIG. 8 illustrates one embodiment of a WiFi hot spot 175. A WiFi hot spot 175 is a site that offers Internet access over a wireless local area network through the use of a router connected to a link to an Internet service provider. For venues that have broadband Internet access, offering wireless access may be as simple as providing an access point in conjunction with a router. The access point may then be coupled with the Internet connection. A single wireless router combining these functions may suffice.

A commercial WiFi hot spot 175 may feature a captive portal/login screen that users are redirected to for authentication and payment and a payment option using credit card, PayPal, or other payment service. In addition, the WiFi hot spot 175 may limit access to certain IP addresses. For example, the WiFi hot spot(s) 175 at the golf course venue may be limited to the streaming site providing the video streaming broadcast of the golf tournament.

The WiFi hot spot 175 may be comprised of a processing component 176, a transmitter component 172, and an antenna component 173. The processing component 176 may control the flow of data into and out of the WiFi hot spot 175 by controlling the other components. The transmitter component 177 may broadcast a formatted video data stream. The formatted video data stream may be encoded for TCP/IP data. The receiver component 178 may be operative to receive the formatted video data stream from the control center 105 before transmitting the video data stream via the transmitter component 177. The receiver component 178 may also be operative to exchange connection requests and establish connections with one or more wireless micro-broadcast receiver devices 190. The antenna component 179 is essentially an electrical device that converts electric power into radio waves, and vice versa and may be adapted to enable the functional capabilities of the receiver component 178 and the transmitter component 177.

In operation, the WiFi hot spot 175 may receive a formatted video data stream from the control center 105. The WiFi hot spot 175 may also receive requests from user wireless smartphone devices 190a to establish a connection with the WiFi hot spot 175. Once a connection is established between a user wireless smartphone devices 190a, a channel may be established enabling the user wireless smartphone devices 190a to receive a streaming broadcast of the formatted video data stream from the WiFi hot spot 175. The formatted video data stream may be specifically formatted for broadcast over a radio frequency spectrum such as that associated with the 802.11 family of RF transmission protocols. The WiFi hot spot transmitter component 177 may be power limited to ensure that the broadcast signal covers the venue intended but does not propagate much beyond before becoming too weak to be received. In addition to limiting the power, the antenna component 173 may be specifically designed to radiate the formatted video data stream to an intended area. Depending on the size of the venue, multiple overlapping WiFi hot spots 175 may be implemented to ensure complete coverage of the venue.

Figure 9:
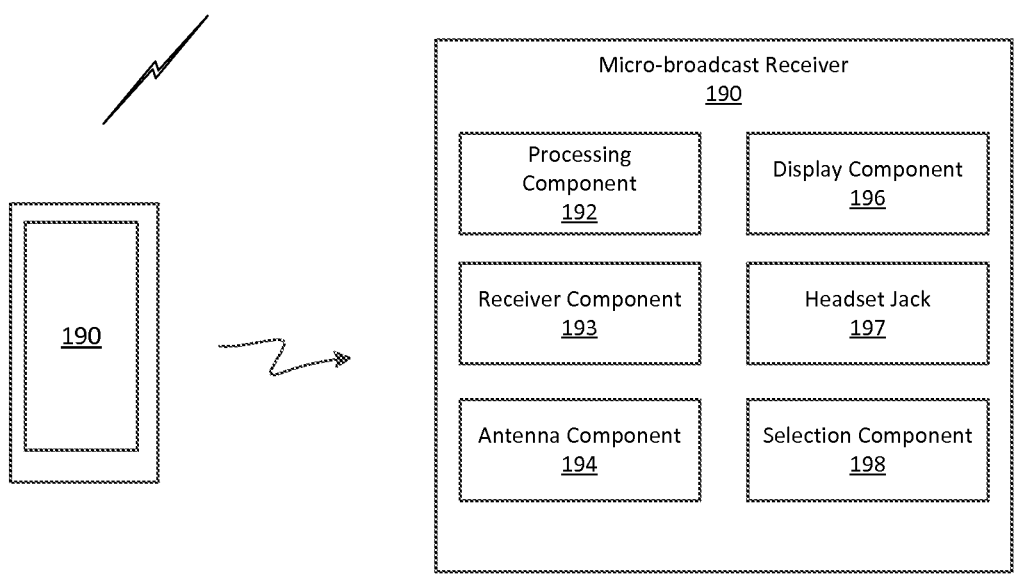
FIG. 9 illustrates one embodiment of a micro-broadcast receiver.

FIG. 9 illustrates one embodiment of a micro-broadcast receiver 190. The micro-broadcast receiver 190 may be comprised of a processing component 192, a receiver component 193, an antenna component 194, a display component 196, a headset jack 197, and a selection component 198. The processing component 192 may control the flow of data into and out of the micro-broadcast receiver 190 by controlling the other components. The receiver component 193 may receive video data streams wirelessly from the micro-broadcast transmitter 170. The antenna component 194 is essentially an electrical device that converts electric power into radio waves, and vice versa and may be adapted to enable the functional capabilities of the receiver component 193. The display component 196 may be operative to display the received video data streams. The headset jack 197 may be operative to accept a headset capable of playing the audio portion of the received video data streams. In some embodiments, the micro-broadcast receiver 190 may not include speakers so as to avoid any possible noise disturbances to those participating (e.g., golfers) in the golf tournament. The audio portion of the video data stream may only be played back through a headset. The selection component 198 may include a tuner component for the receiver component 193. The tuner component may allow the micro-broadcast receiver 190 to choose from among more than one offerings associated with the micro-broadcast 118. For example, one offering may be a micro-broadcast version of the regular broadcast 117. This may mimic the same broadcast sent out to the television audience. Another offering may be a collection of highlight packages put together in the control center 105. The number of offerings may be limited by the amount of bandwidth available to the micro-broadcast transmitter 170.

In operation, the micro-broadcast receiver 190 may receive video data streams from the micro-broadcast transmitter 170 directly. The video data streams may also include an audio portion. The user of the micro-broadcast receiver 190 may then use an interface associated with the selection component 198 and under the control of the processing component 192 to select from among one or more offerings available in the micro-broadcast 118.

Figure 10:
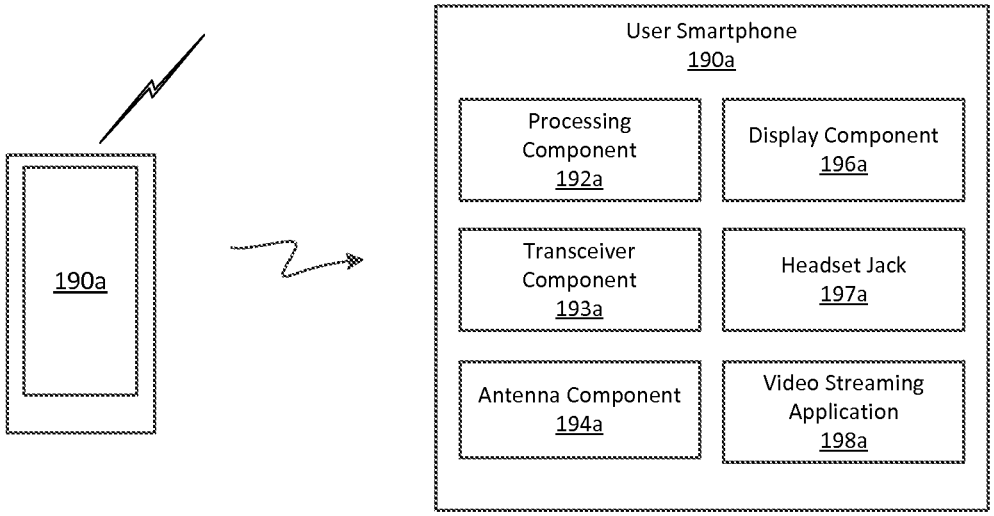
FIG. 10 illustrates one embodiment of a smartphone receiver.

FIG. 10 illustrates one embodiment of a smartphone receiver 190a. The smartphone receiver 190a may be comprised of a processing component 192a, a transceiver component 193a, an antenna component 194a, a display component 196a, a headset jack 197a, and a video streaming application 198a. The processing component 192a may control the flow of data into and out of the smartphone receiver 190a by controlling the other components. The transceiver component 193a may receive video data streams wirelessly from the WiFi hot spot 170. The transceiver component 193a may also send data wirelessly to the WiFi hot spot 175. The antenna component 194 is essentially an electrical device that converts electric power into radio waves, and vice versa and may be adapted to enable the functional capabilities of the receiver component 193. The display component 196 may be operative to display the received video data streams. The headset jack 197 may be operative to accept a headset capable of playing the audio portion of the received video data streams. In some embodiments, the transceiver component 193a may receive disable sound to speakers so as to avoid any possible noise disturbances to those participating (e.g., golfers) in the golf tournament. Thus, the audio portion of the video data stream may only be played back through a headset. The video streaming application 198a may be operative to select from among more than one offerings associated with the streaming broadcast 119. For example, one offering may be a streaming broadcast version of the regular broadcast 117. This may mimic the same broadcast sent out to the television audience. Another offering may be a collection of highlight packages put together in the control center 105. The number of offerings may be limited by the amount of bandwidth available to the WiFi hot spot 175.

In operation, the smartphone receiver 190a may receive video data streams from the WiFi hot spot 175 directly. The video data streams may also include an audio portion. The user of the smartphone receiver 190a may then use an interface associated with the video streaming application 198a and under the control of the processing component 192a to select from among one or more offerings available in the streaming broadcast 119.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 11:
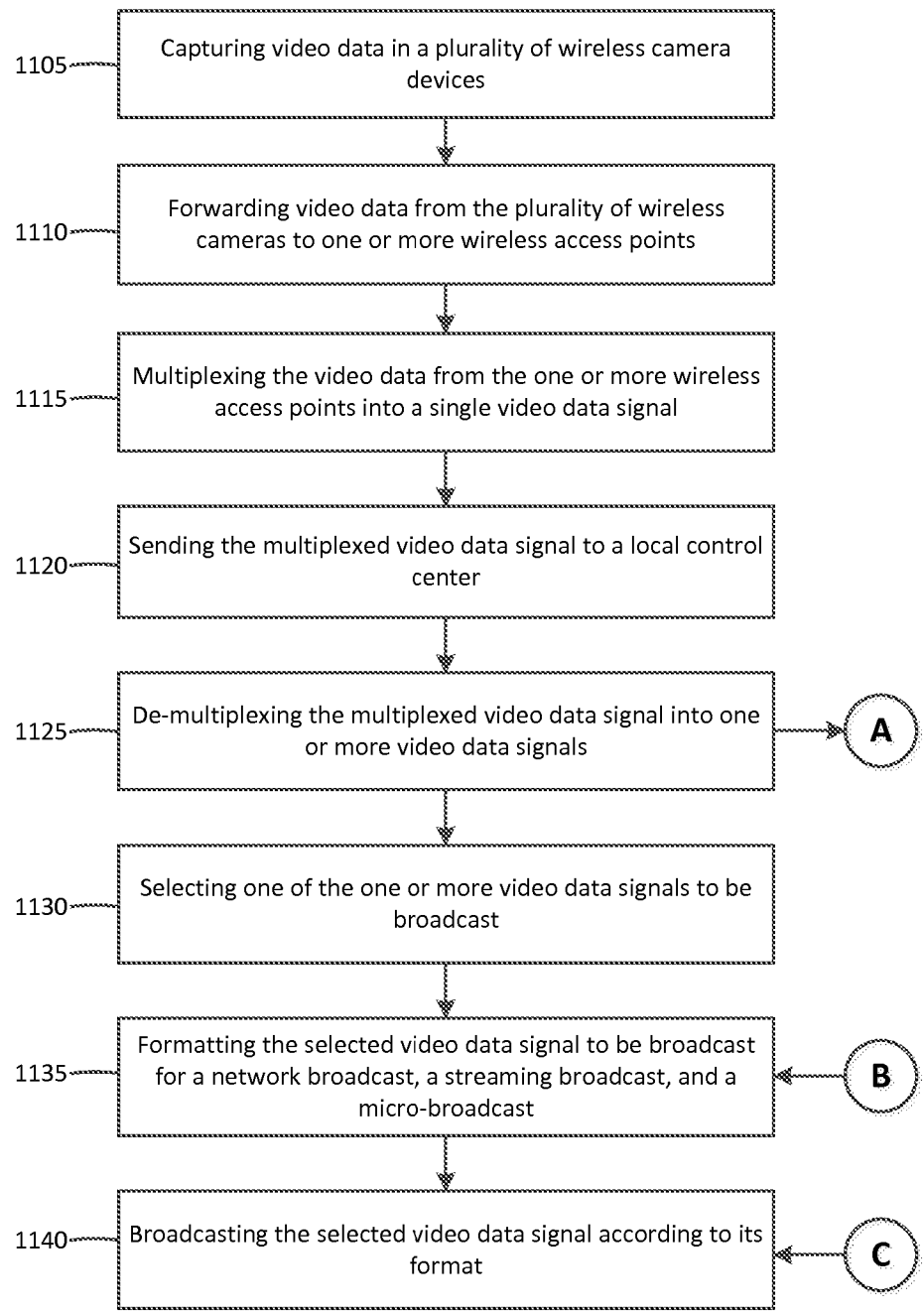
FIG. 11 illustrates one embodiment of a logic flow.

FIG. 11 illustrates one embodiment of a logic flow 1100. The logic flow 1100 may be representative of some or all of the operations executed by one or more embodiments described herein.

In the illustrated embodiment shown in FIG. 11, the logic flow 1100 may capture video data streams in a plurality of wireless camera devices 140 at block 1105. It should be noted that a video data stream captured by a wireless camera device (or other video camera devices) may also include an associated audio component. Thus, while the description herein may refer to a "video data stream", the term is intended to comprise both video and audio data making it an audio-visual data stream. For example, multiple wireless camera devices 140 may be used by roving cameramen to gather video data streams of an event such as, for instance, a sporting event. One example of a sporting event may be a golf tournament. The roving wireless camera devices 140 may provide a variety of different views and perspectives when compared to a set of stationary cameras. The roving nature of these cameras presents a problem if they are tethered via a cable to a control center 105. By using wireless camera devices 140, the need for a cable is removed and the flexibility afforded results in a broadcast that can present many more views and perspectives. The embodiments are not limited to this example.

The logic flow 1100 may forward the captured video data stream from the wireless camera devices 140 to one or more wireless access points 150 at block 1110. For example, a plurality of strategically placed wireless access points 150 may be set up around the venue of the event. For a golf tournament, this could mean that wireless access points 150 are spaced apart at different points on the golf course. The wireless access points 150 may be strategically placed such that the effective coverage range for each wireless access point 150 overlaps at least slightly with another wireless access point 150. The overlapping coverage ensures that there will be no dead spots at the venue and that a wireless camera device 140 may always be able to establish a connection with at least one wireless access point 150 regardless of its position on the golf course. Upon establishing a connection using, for instance, an 802.11 access protocol, a wireless camera may transfer or send video data streams it has captured to the wireless access point 150 with which it has established a connection. As the wireless camera device 140 roves around the venue it may leave the range of one wireless access point 150 and enter the range of another wireless access point 150. A new connection or handoff from the first wireless access point 150 to the new wireless access point 150 may then be established. The embodiments are not limited to this example.

Each of the wireless access points 150, in turn, may be coupled with a control center 105 responsible for broadcasting the event (e.g., golf tournament). This coupling may be wired or wireless. A wired coupling may be feasible because the wireless access points are fixed in location and may be situated out of the way of patrons and participants (e.g., players, officials, media representatives, etc.). The embodiments are not limited to this example.

The logic flow 1100 may multiplex video data streams received from multiple wireless access points into a single video data signal at block 1115. For example, each of the wireless access points 150 may be coupled to a multiplexer 120. The multiplexer 120 may be conveniently located within the venue such that cabling from each of the wireless access points 150 is minimized.

In general, multiplexers are mainly used to increase the amount of data that can be sent over the network within a certain amount of time and bandwidth. The multiplexer 120 is a device that combines several input information signals into one output signal that may carry several communication channels. Multiplexers save cost by connecting a multiplexer and a de-multiplexer together over a single channel. The cost of implementing separate channels for each wireless access point 150 may be more expensive than the cost and inconvenience of providing the multiplexing/de-multiplexing functions. The embodiments are not limited to this example.

The logic flow 1100 may send the multiplexed video data signal to a control center 105 at block 1120. For example, a single communication channel cable may forward the output of the multiplexer 120 to the input of a de-multiplexer 110. The de-multiplexer 110 may be associated with a control center 105. The control center 105 may include many components operative to manipulate the received video data signals for the primary purpose of broadcasting the event to a television audience. The embodiments are not limited to this example.

The logic flow 1100 may de-multiplex a received multiplexed video signal at block 1125. For example, at the receiving end (e.g., control center 105), a complementary de-multiplexer 110 may be implemented to break the single video data signal back into its original video data streams. In addition to any other signal manipulation that may occur at the control center 105, the de-multiplexed video data streams may be stored in a memory component 350 within the control center 105. The embodiments are not limited to this example.

The logic flow 1100 may select one of the de-multiplexed video data streams to be broadcast at block 1130. For example, an operator such as a director may oversee operations within the control center 105. The director may be responsible for coordinating the multiple available video data streams received from a variety of video camera devices (including the wireless camera devices 140) into a single broadcast. As only one video data stream may be broadcast at a time, the director may frequently select from among the multiple available video data streams to broadcast. The director's instructions may be carried out by others operating equipment including switching component 320 within control center 105. The embodiments are not limited to this example.

The logic flow 1100 may format the selected video data stream at block 1135. For example, the control center may be responsible for providing a regular broadcast 117 to a television audience, a live streaming broadcast 119 to an Internet based audience, and a micro-broadcast 119 to a localized audience generally comprised of patrons of the event. Each of these broadcasts may require that the video data stream that is broadcast be formatted in a different manner to suit the broadcast infrastructure and receiver technology. For example, the regular broadcast 117 may format the video data stream according to NTSC, DTV, SDTV, or HDTV standards. The streaming broadcast 119 may format the video data stream according to MPEG4 standards using the H.264 protocol for streaming video over the Internet. The micro-broadcast 118 may format the video data stream for short distance RF transmission using an available frequency spectrum. The encoding of the video data stream may depend on the decoder used by a receiving device 190 and may be accomplished using the aforementioned NTSC, DTV, SDTV, or HDTV standards. The embodiments are not limited to this example.

The logic flow 1100 may broadcast the selected video data stream at block 1140. For example, the formatted selected video data stream may be sent to a satellite uplink 60 where it is sent for regular broadcast 117 to a television viewing audience. Likewise, the formatted selected video data stream may be sent over the Internet 50 to a web server 75 under control of the broadcaster. The broadcaster's web server 75 may then regulate access to the live video streaming to authorized users over the Internet 50. For example, the web server 50 may receive requests to download the live streaming broadcast 119 from any number of Internet enabled devices having the appropriate video decoding hardware and software. The server 50 may provide the download only to those authorized as determined by a registration of some type or may make the live streaming broadcast available freely. Lastly, the formatted selected video data stream may be sent to a micro-broadcast transmitter 170 where it is sent for micro-broadcast 118 to a localized viewing audience comprised of patrons of the event that have secured a micro-broadcast receiving device 190. The embodiments are not limited to this example.

Figure 12:
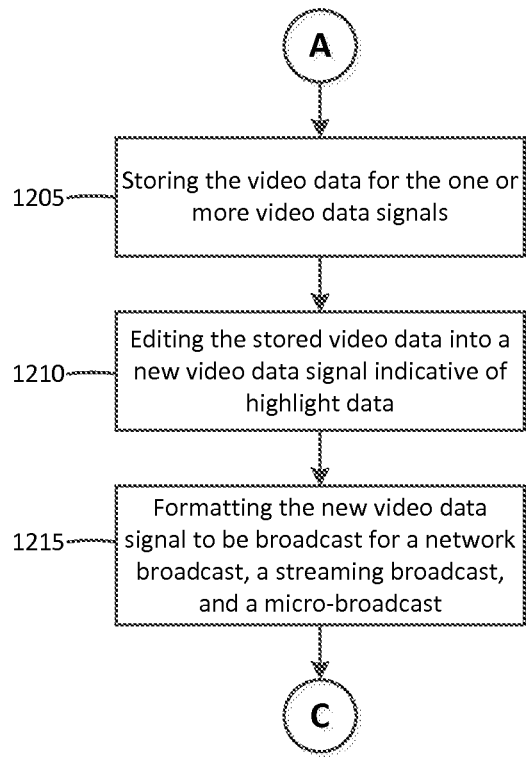
FIG. 12 illustrates one embodiment of a logic flow.

FIG. 12 illustrates one embodiment of a logic flow 1200. The logic flow 1200 may be representative of some or all of the operations executed by one or more embodiments described herein.

In the illustrated embodiment shown in FIG. 12, the logic flow 1200 may store video data streams representative of the de-multiplexed video data streams at block 1205. For example, the de-multiplexer 110 may provide the de-multiplexed video data streams to a processing component 115. The processing component 115 essentially controls the various components within the control center 105. The processing component 115 may then forward the video data streams to a memory component 350. The memory component 350 may be accessible to a software component 340 under control of the processor component 115. The software component 340 may include applications operative to manipulate video data streams. The embodiments are not limited to this example.

The logic flow 1200 may edit stored video data streams into a new video data stream indicative of event highlights at block 1210. For example, a highlight package application 342 within the software component 340 may be operative to retrieve and manipulate stored video data streams. An operator may invoke the highlight package application 342 using an interface and peripheral devices (not shown) to cut and paste segments of video data streams from one or more separate video data stream files stored in memory component 350. For instance, one highlight package may include video clips showing action solely on the 16$^{th}$ hole of a golf tournament. Another highlight package may include video clips of a single competitor (e.g., golfer) showing snippets of his play throughout his round. The embodiments are not limited to this example.

The logic flow 1200 may format the new video data stream indicative of a highlight package for broadcast at block 1215. For example, the highlight package application 342 may convert an edited highlight package video data stream file into a format suitable for use in a regular broadcast 117, a live streaming broadcast 119, and a micro-broadcast 118. For example, the format for a regular broadcast 117 may include formatting the video data stream according to NTSC, DTV, SDTV, or HDTV standards. The format for a live streaming broadcast 119 may include formatting the video data stream according to MPEG4 standards using the H.264 protocol for streaming video over the Internet. The format for a micro-broadcast 118 may include formatting the video data stream for short distance RF transmission using an available frequency spectrum. The encoding of the video data stream may depend on the decoder used by a receiving device 190 and may be accomplished using the aforementioned NTSC, DTV, SDTV, or HDTV standards. The video data stream may then be broadcast (regular 117, live streaming 119, micro—118) as set out in block 1140 of FIG. 11. The embodiments are not limited to this example.

Figure 13:
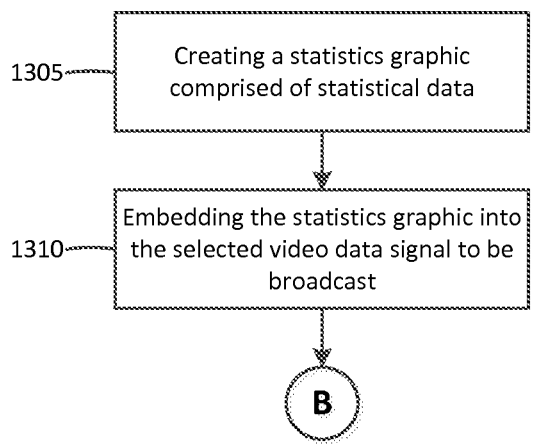
FIG. 13 illustrates one embodiment of a logic flow.

FIG. 13 illustrates one embodiment of a logic flow 1300. The logic flow 1300 may be representative of some or all of the operations executed by one or more embodiments described herein.

In the illustrated embodiment shown in FIG. 13, the logic flow 1300 may create a statistics graphic comprised of statistical data at block 1305. For example, a stats component application 344 within the software component 340 of the control center 105 may be operative to collect and organize statistical data pertinent to the event being broadcast. The stats component application 344 may, for instance, be a software application that may access one or more data repositories containing information. The stats component application 344 may, based on the input of an operator, organize statistical data pertinent to the event (e.g., golf tournament). In one example, an operator may use the stats component application 344 to gather data pertaining to a particular competitor (e.g., golfer). This information may include the scores this competitor has shot up to this point. The information may be organized into a graphical representation of a scorecard. The scorecard may include other identifying data such as, for instance, the hole number, par for the hole, yardage of the hole. Scores that are below par for a hole may be highlighted with a circle around the score while scores that are above par for a hole may be highlighted with a square around the score. In another example, an operator may use the stats component application 344 to organize data indicative of the leaders of the event (e.g., golf tournament). The data may be organized into a 'leaderboard' listing the name of the players in descending order along with a score relative to par and the latest hole that has been completed. There are numerous other examples of statistical data that may be generated and represented by graphics. The examples provided herein are merely illustrative and the embodiments are not limited to these examples.

The logic flow 1300 may embed a statistics graphic into a selected video data stream at block 1310. For example, the stats component application 344 may combine a statistics graphic with the selected video data stream being broadcast such that the resulting video data stream actually broadcast is a composite of the selected video data stream and the statistics graphic. The stats component application 344 may insert and remove the statistics graphic into the live feed for a predetermined amount of time (e.g., a set number of frames of video data) or can insert and remove the statistics graphic at will. The video data stream with embedded statistics graphic may then be formatted for a particular broadcast (regular 117, live streaming 119, micro—118) as set out in block 1135 of FIG. 11. The embodiments are not limited to this example.

Figure 14:
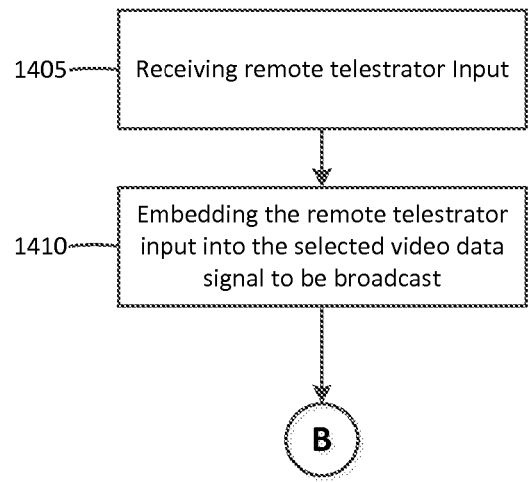
FIG. 14 illustrates one embodiment of a logic flow.

FIG. 14 illustrates one embodiment of a logic flow 1400. The logic flow 1400 may be representative of some or all of the operations executed by one or more embodiments described herein.

In the illustrated embodiment shown in FIG. 14, the logic flow 1400 may receive telestrator input at block 1405. For example, a telestrator tablet 180 may receive a video data stream from one of the wireless cameras 140 directly or may receive the micro-broadcast 118 from the micro-broadcast transmitter 170. A user of the telestrator tablet 180 may then use a stylus instrument 181 to draw on a touch screen display 183. The data representative of the drawing made by the user may be sent back to the control center 105 by way of a wireless access point 150. The embodiments are not limited to this example.

The logic flow 1400 may embed the telestrator input into a selected video data stream at block 1410. For example, the control center 105 may then include the telestrator data into the regular broadcast 117, the micro-broadcast 118, and the streaming broadcast 119 to give viewers an enhanced viewing experience. The broadcast emanating from the control center may be delayed by a specified number of video frames to allow for the telestrator data to be inserted into the various broadcasts. The video data stream with embedded telestrator input may then be formatted for a particular broadcast as set out in block 1135 of FIG. 11. The embodiments are not limited to this example.

Figure 15:
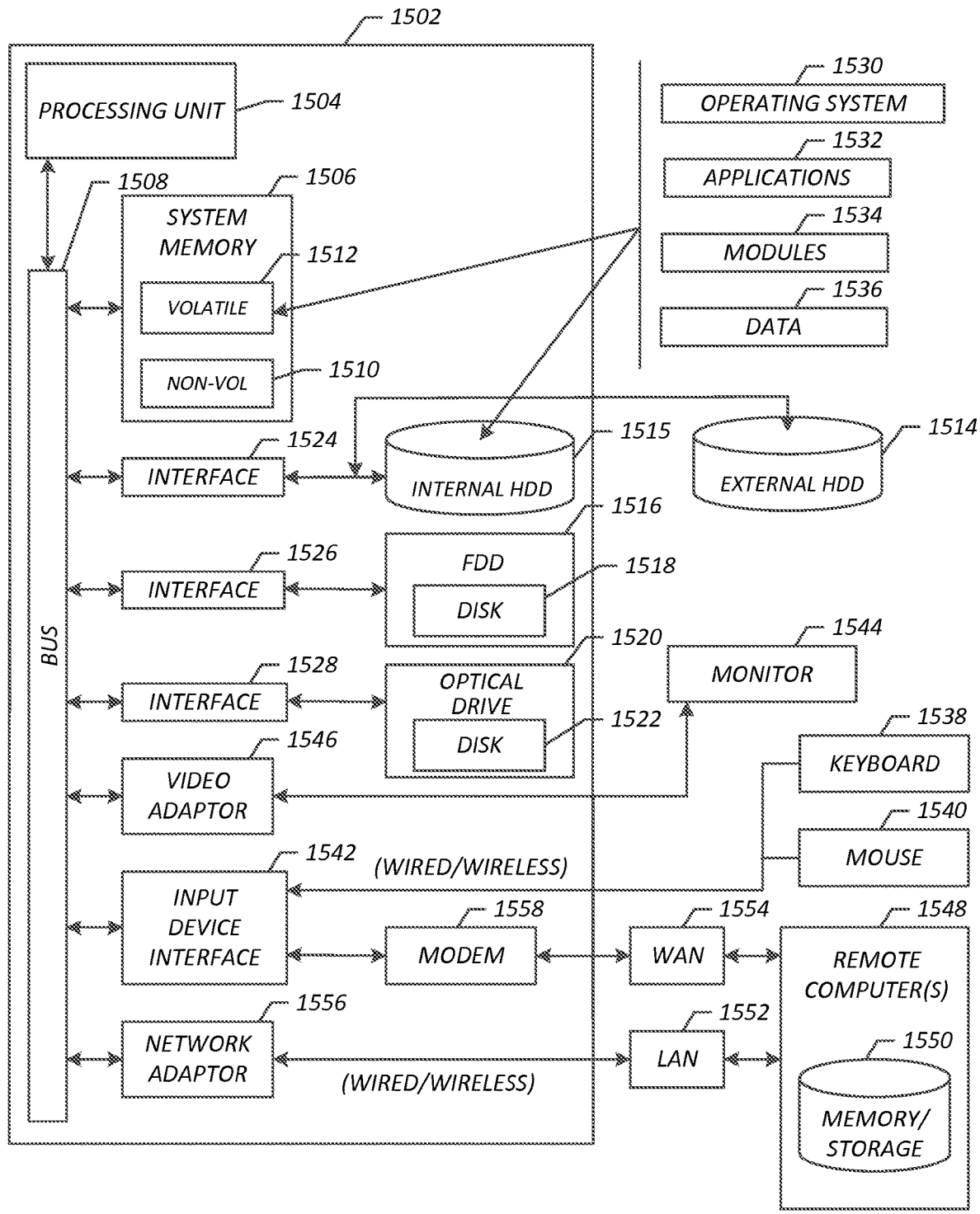
FIG. 15 illustrates an embodiment of a computing architecture.

FIG. 15 illustrates an embodiment of an exemplary computing architecture 1500 suitable for implementing various embodiments as previously described. In one embodiment, the computing architecture 1500 may comprise or be implemented as part of an electronic device. Examples of an electronic device may include those described with reference to FIGS. 3-10, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1500 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1500.

As shown in FIG. 15, the computing architecture 1500 comprises a processing unit 1504, a system memory 1506 and a system bus 1508. The processing unit 1504 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1504.

The system bus 1508 provides an interface for system components including, but not limited to, the system memory 1506 to the processing unit 1504. The system bus 1508 can be any of several types of bus structure that may further interconnect to a memory bus (with or without a memory controller), a peripheral bus, and a local bus using any of a variety of commercially available bus architectures. Interface adapters may connect to the system bus 1508 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1500 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1506 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 15, the system memory 1506 can include non-volatile memory 1510 and/or volatile memory 1512. A basic input/output system (BIOS) can be stored in the non-volatile memory 1510.

The computer 1502 may include various types of computer-readable storage media in the form of one or more lower speed memory units, including an internal (or external) hard disk drive (HDD) 1514, a magnetic floppy disk drive (FDD) 1516 to read from or write to a removable magnetic disk 1518, and an optical disk drive 1520 to read from or write to a removable optical disk 1522 (e.g., a CD-ROM or DVD). The HDD 1514, FDD 1516 and optical disk drive 1520 can be connected to the system bus 1508 by a HDD interface 1524, an FDD interface 1526 and an optical drive interface 1528, respectively. The HDD interface 1524 for external drive implementations can include at least one or both of Universal Serial Bus (USB) and IEEE 1594 interface technologies.

The drives and associated computer-readable media provide volatile and/or nonvolatile storage of data, data structures, computer-executable instructions, and so forth. For example, a number of program modules can be stored in the drives and memory units 1510, 1512, including an operating system 1530, one or more application programs 1532, other program modules 1534, and program data 1536. In one embodiment, the one or more application programs 1532, other program modules 1534, and program data 1536 can include, for example, the various applications and/or components of the system 100.

A user can enter commands and information into the computer 1502 through one or more wire/wireless input devices, for example, a keyboard 1538 and a pointing device, such as a mouse 1540. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1504 through an input device interface 1542 that is coupled to the system bus 1508, but can be connected by other interfaces such as a parallel port, IEEE 1594 serial port, a game port, a USB port, an IR interface, and so forth.

A monitor 1544 or other type of display device is also connected to the system bus 1508 via an interface, such as a video adaptor 1546. The monitor 1544 may be internal or external to the computer 1502. In addition to the monitor 1544, a computer typically includes other peripheral output devices, such as speakers, printers, and so forth.

The computer 1502 may operate in a networked environment using logical connections via wire and/or wireless communications to one or more remote computers, such as a remote computer 1548. The remote computer 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wire/wireless connectivity to a local area network (LAN) 1552 and/or larger networks, for example, a wide area network (WAN) 1554. Such LAN and WAN networking environments are commonplace in offices and companies, and facilitate enterprise-wide computer networks, such as intranets, all of which may connect to a global communications network, for example, the Internet.

When used in a LAN networking environment, the computer 1502 is connected to the LAN 1552 through a wire and/or wireless communication network interface or adaptor 1556. The adaptor 1556 can facilitate wire and/or wireless communications to the LAN 1552, which may also include a wireless access point disposed thereon for communicating with the wireless functionality of the adaptor 1556.

When used in a WAN networking environment, the computer 1502 can include a modem 1558, or is connected to a communications server on the WAN 1554, or has other means for establishing communications over the WAN 1554, such as by way of the Internet. The modem 1558, which can be internal or external and a wire and/or wireless device, connects to the system bus 1508 via the input device interface 1542. In a networked environment, program modules depicted relative to the computer 1502, or portions thereof, can be stored in the remote memory/storage device 1550. It will be appreciated that the network connections shown are exemplary and other means of establishing a communications link between the computers can be used.

The computer 1502 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method, comprising:
receiving a plurality of video data streams and telestrator data from a network of wireless access points, the plurality of video data streams of a live event at a venue;
selecting, from the plurality of video data streams and a highlight package, a first video data stream of the plurality of video data streams to be micro-broadcast, the highlight package comprising a plurality of video data segments of at least two video data streams of the plurality of video data streams;

inserting the telestrator data into first video data stream while broadcasting of the first video data stream is delayed by a specified number of frames;

formatting the first video data stream into a modulated data stream for a micro-broadcast over a specific localized frequency range;

limiting a range of a micro-broadcast transmitter located at the venue by limiting a power of the micro-broadcast transmitter; and broadcasting, by an antenna component of the micro-broadcast transmitter, the micro-broadcast formatted first video data stream including the telestrator data to devices within a limited geographic area confined to the venue for the live event by radiating the micro-broadcast formatted first video data stream specifically to the limited geographic area.

2. The method of claim 1, further comprising:

delaying broadcasting of the first video data stream by the specified number of frames when the telestrator data is inserted into the first video data stream, wherein each video data stream comprises a plurality of data segments, the at least two video data streams comprising a second video data stream and a third video data stream of the plurality of video data streams.

3. The method of claim 1, further comprising:

sending the micro-broadcast formatted first video data stream including the telestrator data to the micro-broadcast transmitter.

4. The method of claim 1, the network of wireless access points comprising one or more wireless access points arranged about the venue to provide wireless communication coverage to the devices and a plurality of cameras capturing the plurality of video data streams, a sporting event occurring at the venue including a plurality of competitors, each competitor associated with statistical data pertaining to participation in the event and participation in a sport.

5. The method of claim 4, the highlight package comprised of video data depicting a first competitor of the plurality of competitors, the video data depicting the first competitor selected from a second video data stream of the plurality of video data streams, the method further comprising:

embedding the statistical data into the first video data stream to be broadcast.

6. The method of claim 5, the highlight package further comprised of video data depicting a first location of the venue and video data depicting a second competitor of the plurality of competitors, the video data depicting the first location of the venue selected from a third video data stream of the plurality of video data streams, the video data depicting the second competitor selected from a fourth video data stream of the plurality of video data streams.

7. The method of claim 1, the telestrator data received at one of the wireless access points over a wireless connection with a telestrator device, the telestrator data associated with a video data stream captured by the telestrator device, the video data stream captured by the telestrator device one of the received plurality of video data streams, the method further comprising:

multiplexing the plurality of video data streams from each of the wireless access points into a single video data signal before relaying the plurality of video data streams to a control center;

forwarding the multiplexed video data signal to the control center; and de-multiplexing the multiplexed video data signal back into the plurality of video data streams before selecting first video data stream to be broadcast.

8. The method of claim 1, further comprising:

formatting the first video stream for a television broadcast;

forwarding the formatted first video stream for the television broadcast to a satellite up-link for the television broadcast;

formatting the first video stream for a transmission control protocol/Internet protocol (TCP/IP) streaming broadcast; and streaming the formatted first video stream for the TCP/IP streaming broadcast via the internet.

9. A system, comprising:

a computer processor; and a memory storing instructions which when executed by the processor cause the processor to:

receive a plurality of video data streams and telestrator data from a network of wireless access points, the plurality of video data streams of a live event at a venue;

select, from the plurality of video data streams and a highlight package, a first video data stream of the plurality of video data streams to be broadcast, the highlight package comprising a plurality of video data segments of at least two video data streams of the plurality of video data streams;

insert the telestrator data into first video data stream while broadcasting of the first video data stream is delayed by a specified number of frames;

format the first video data stream into a modulated data stream for a micro-broadcast over a specific localized frequency range;

limit a range of a micro-broadcast transmitter located at the venue by limiting a power of the micro-broadcast transmitter; and broadcast, by an antenna component of the micro-broadcast transmitter, the micro-broadcast formatted first video data stream including the telestrator data to devices within a limited geographic area confined to the venue for the live event by radiating the micro-broadcast formatted first video data stream specifically to the limited geographic area.

10. The system of claim 9, wherein each video data stream comprises a plurality of data segments, the at least two video data streams comprising a second video data stream and a third video data stream of the plurality of video data streams, the memory storing instructions which when executed by the processor cause the processor to:

delay broadcasting of the first video data stream by the specified number of frames when the telestrator data is inserted into the first video data stream.

11. The system of claim 9, the memory storing instructions which when executed by the processor cause the processor to:

send the formatted first video data stream including the telestrator data to the micro-broadcast transmitter.

12. The system of claim 10, the network of wireless access points comprising one or more wireless access points arranged about the venue to provide wireless communication coverage to the devices and a plurality of cameras capturing the plurality of video data streams, a sporting event occurring at the venue including a plurality of competitors, each competitor associated with statistical data pertaining to participation in the event and participation in a sport.

13. The system of claim 12, the highlight package comprised of video data depicting a first competitor of the plurality of competitors, the video data depicting the first competitor selected from a second video data stream of the plurality of video data streams, the memory storing instructions which when executed by the processor cause the processor to:
  embed the statistical data into the first video data stream to be broadcast.

14. The system of claim 13, the highlight package further comprised of video data depicting a first location of the venue and video data depicting a second competitor of the plurality of competitors, the video data depicting the first location of the venue selected from a third video data stream of the plurality of video data streams, the video data depicting the second competitor selected from a fourth video data stream of the plurality of video data streams.

15. The system of claim 9, the telestrator data received at one of the wireless access points over a wireless connection with a telestrator device, the telestrator data associated with a video data stream captured by the telestrator device, the video data stream captured by the telestrator device one of the received plurality of video data streams, the memory storing instructions which when executed by the processor cause the processor to:
  multiplex the plurality of video data streams from each of the wireless access points into a single video data signal before relaying the plurality of video data streams to a control center;
  forward the multiplexed video data signal to the control center; and
  de-multiplex the multiplexed video data signal back into the plurality of video data streams before selecting first video data stream to be broadcast.

16. A non-transitory computer-readable storage medium storing computer-readable instructions executable by a processor to cause the processor to:
  receive a plurality of video data streams and telestrator data from a network of wireless access points, the plurality of video data streams of a live event at a venue;
  select, from the plurality of video data streams and a highlight package, a first video data stream of the plurality of video data streams to be broadcast, the highlight package comprising a plurality of video data segments of at least two video data streams of the plurality of video data streams;
  insert the telestrator data into first video data stream while broadcasting of the first video data stream is delayed by a specified number of frames;
  format the first video data stream into a modulated data stream for a micro-broadcast over a specific localized frequency range;
  limit a range of a micro-broadcast transmitter located at the venue by limiting a power of the micro-broadcast transmitter; and
  broadcast, by an antenna component of the micro-broadcast transmitter, the micro-broadcast formatted first video data stream including the telestrator data to devices within a limited geographic area confined to the venue for the live event by radiating the micro-broadcast formatted first video data stream specifically to the limited geographic area.

17. The non-transitory computer-readable storage medium of claim 16, storing computer-readable instructions executable by the processor to cause the processor to:
  delay broadcasting of the first video data stream by the specified number of frames when the telestrator data is inserted into the first video data stream, wherein each video data stream comprises a plurality of data segments, the at least two video data streams comprising a second video data stream and a third video data stream of the plurality of video data streams.

18. The non-transitory computer-readable storage medium of claim 16, storing computer-readable instructions executable by the processor to cause the processor to:
  send the formatted first video data stream including the telestrator data to the micro-broadcast transmitter.

19. The non-transitory computer-readable storage medium of claim 16, a sporting event occurring at the venue including a plurality of competitors, each competitor associated with statistical data pertaining to participation in the event and participation in a sport, the highlight package further comprised of video data depicting a first location of the venue and video data depicting a second first competitor of the plurality of competitors, the video data depicting the first location of the venue selected from a second video data stream of the plurality of video data streams.

20. The non-transitory computer-readable storage medium of claim 19, the highlight package further comprised of video data depicting a second competitor of the plurality of competitors, the video data depicting the second competitor selected from a third video data stream of the plurality of video data streams, storing computer-readable instructions executable by the processor to cause the processor to:
  embed the statistical data into the first video data stream to be broadcast.

* * * * *

UNITED STATES PATENT AND TRADEMARK OFFICE
CERTIFICATE OF CORRECTION

PATENT NO. : 10,931,921 B2
APPLICATION NO. : 16/201637
DATED : February 23, 2021
INVENTOR(S) : Bruce Goldfeder et al.

It is certified that error appears in the above-identified patent and that said Letters Patent is hereby corrected as shown below:

In the Claims

Column 24 Lines 29-38 Claim 19 should read:
19. The non-transitory computer-readable storage medium of claim 16, a sporting event occurring at the venue including a plurality of competitors, each competitor associated with statistical data pertaining to participation in the event and participation in a sport, the highlight package further comprised of video data depicting a first location of the venue and video data depicting a first competitor of the plurality of competitors, the video data depicting the first location of the venue selected from a second video data stream of the plurality of video data streams.

Signed and Sealed this
Fifteenth Day of November, 2022

Katherine Kelly Vidal
*Director of the United States Patent and Trademark Office*